Patented Nov. 16, 1937

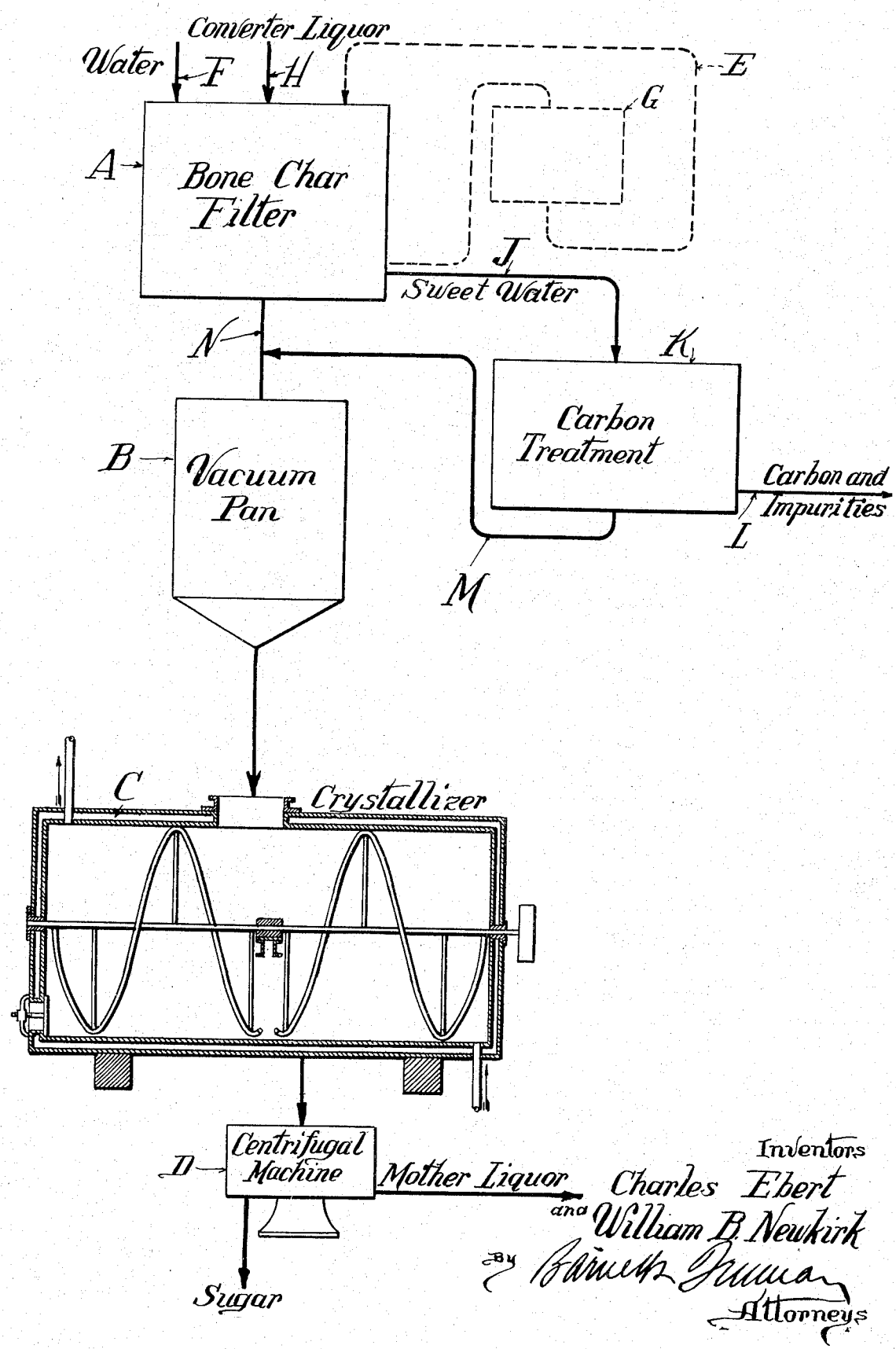

2,099,389

UNITED STATES PATENT OFFICE 2,099,389

METHOD OF REFINING SUGAR LIQUORS

Charles Ebert, Leonia, N. J., and William B. Newkirk, Western Springs, Ill., assignors to International Patents Development Company, Wilmington, Del., a corporation of Delaware Application April 11, 1935, Serial No. 15,800

4 Claims. (Cl. 127—55)

This invention relates to the refining of sugar liquors, generally, and, more particularly, to the refinement of starch converted solutions as are incident to the production of crystalline high purity dextrose.

It has been the practice in the manufacture of dextrose, for example, to pass the converted liquor through bone char filters before the liquor is sent to the crystallizers for the purpose of decoloration of the liquor and removal of impurities by adsorption. It has also been customary to circulate fresh water through the bone char filters, at intervals, for removal of sugar retained by the bone char, and to return this liquor, known as sweet water, to the process so as to recover the sugar therein. This practice has resulted in introducing into the crystallizers impurities, both soluble and colloidal, removed from the bone char filters with the sugar material. That is, the impurities adsorbed by the bone char are held by the char more or less tenaciously. The substances adhering less tenaciously to the char are likely to be removed by the wash water. These impurities are detrimental in subsequent stages of the process. In particular they tend to interfere with the proper crystallization of the solution and the purging of the massecuite of its mother liquor.

The object of the present invention is to avoid this re-circulation of impurities through the system; and the object is accomplished by subjecting the sweet waters to an adsorption treatment before they are returned to the process. Preferably this adsorption treatment is accomplished by the use of activated carbons of the type of Norrit, Darko, Suchar, Antichromos and the like; and the carbon with the adsorbed impurities is removed from the sweet water before the sweet water is returned to the process.

The invention is illustrated in the accompanying flow sheet diagram.

Referring to the flow sheet, A designates a bone char filter, B a vacuum pan for concentrating the filtered liquor to a density suitable for crystallization; C the crystallizer; and D one of the centrifugal machines into which the massecuite from the crystallizer is delivered. The dotted line E represents the pipe line, according to the old process, for returning the sweet water, introduced into the bone char filter as fresh water at F, back into the bone char filter; this line being provided, preferably, with a storage tank G. H is the pipe for conducting the converter liquor to the bone char filter.

According to the present process the sweet water is withdrawn from the bone char filter A through pipe J to a vessel K where it is treated with finely divided activated carbon at a temperature of approximately 160° F. for a period of thirty minutes or longer. Before treatment the hydrogen concentration of the sweet water is adjusted, if necessary, in accordance with the kind of carbon used to give the pH most advantageous for the adsorption operation. The amount of carbon used will vary in accordance with the impurities in the sweet waters and the character of the carbon employed. For virgin carbons the amount will vary from 0.2% to 0.5% by weight of the dry substance in the sweet water. When partially spent carbons are used the amount will be larger. The carbon and impurities are withdrawn at L and the refined sweet water returned to the process through pipe line M which is shown as tapping the pipe N between the bone char filters and the vacuum pan. The refined sweet waters may be returned to the process, however, at any suitable point. The indicated position of the bone char filter with respect to the other instrumentalities for carrying out the process is purely illustrative. The filter (or filters where more than one is used) may be employed in any arrangement customary in the refining of sugars.

We claim:

1. In the process of making dextrose from starch converted dextrose solutions in which the converted liquor before crystallization is passed through a bone char filter, water circulated at intervals through the filter, and the sweet water mixed with dextrose solution to be crystallized and then returned to the process for recovery of its sugar content in the crystallizing operation: the improvement which consists in removing from the sweet water by an adsorption treatment, before the sweet water is returned to the process, impurities therein which have been washed from the filter and would otherwise interfere with the crystallization of dextrose.

2. In the process of making dextrose from starch converted dextrose solutions in which the converted liquor before crystallization is passed through a bone char filter, water circulated at intervals through the filter, and the sweet water mixed with dextrose solution to be crystallized and thus returned to the process for recovery of its sugar content in the crystallizing operation: the improvement which consists in introducing activated carbon into the sweet water and removing the carbon and adsorbed substances from the liquid before its return to the process.

3. In the process of making dextrose from starch converted dextrose solutions in which the converted liquor before crystallization is passed through a bone char filter, water circulated at intervals through the filter, and the sweet water mixed with dextrose solution to be crystallized and thus returned to the process for recovery of its sugar content in the crystallizing operation: the improvement which consists in subjecting the sweet water to treatment with 0.2% to 0.5% of virgin activated carbon, or to proportionately larger quantities of partially spent carbon, at a temperature of approximately 160° F. for approximately thirty minutes, removing the carbon and adsorbed impurities from the sweet water and then returning the purified sweet water to the process.

4. In the process of making dextrose from starch converted dextrose solutions in which the converted liquor before crystallization is passed through a bone char filter, water circulated at intervals through the filter and the sweet water mixed with dextrose solution to be crystallized and thus returned to the process for recovery of its sugar content in the crystallizing operation: the improvement which consists in removing from the sweet water before it is returned to the process the impurities therein which have been washed from the filter and would otherwise interfere with the crystallization of dextrose.

CHARLES EBERT.
WILLIAM B. NEWKIRK.